C. JASS.
EARTH PULVERIZING MACHINE.
APPLICATION FILED MAY 27, 1909.
1,045,295.
Patented Nov. 26, 1912.
2 SHEETS—SHEET 1.
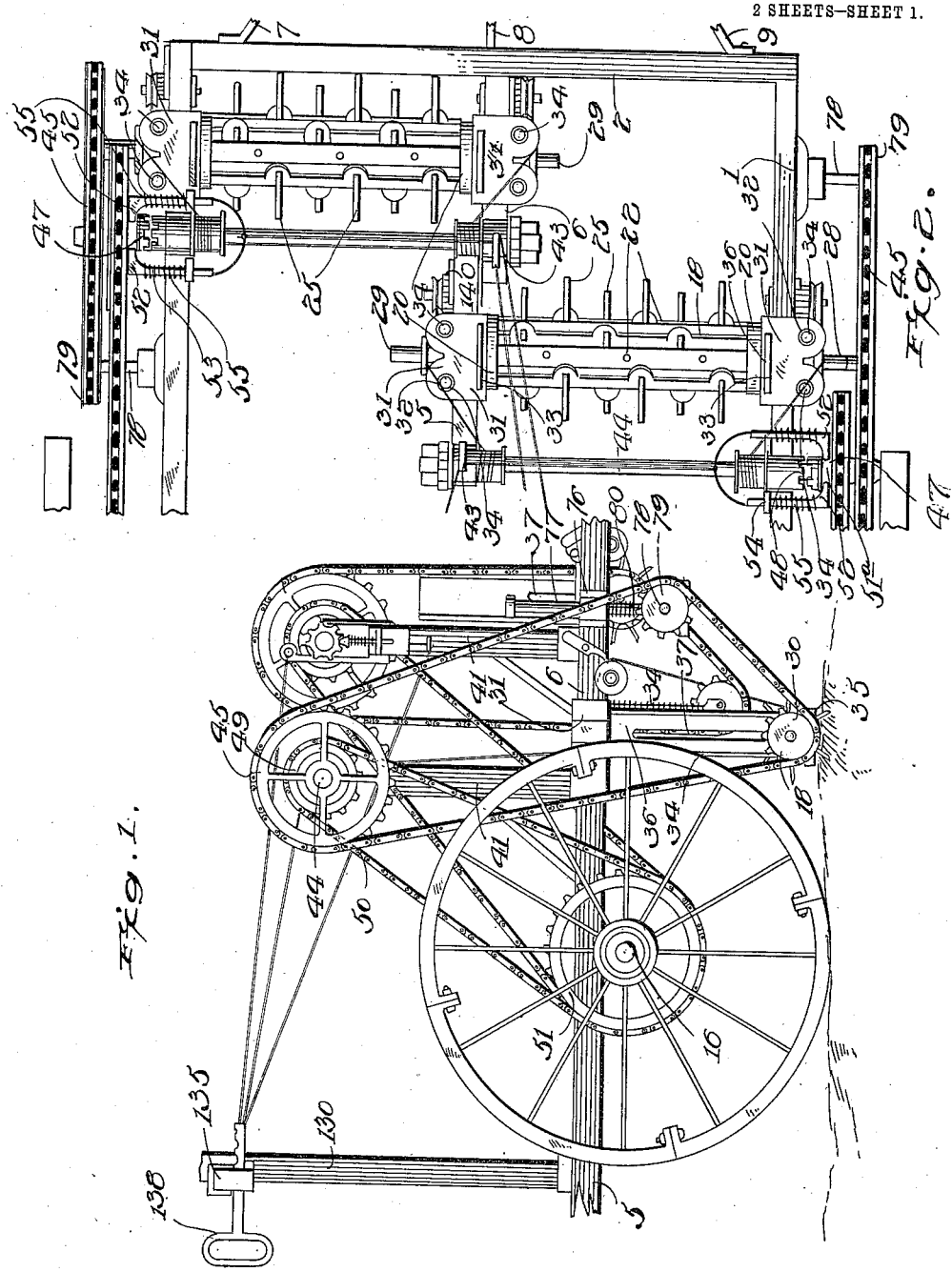
WITNESSES
J. W. Nee
L. N. Gillis
INVENTOR
Carl Jass
By F. E. Vrooman, Attorney.

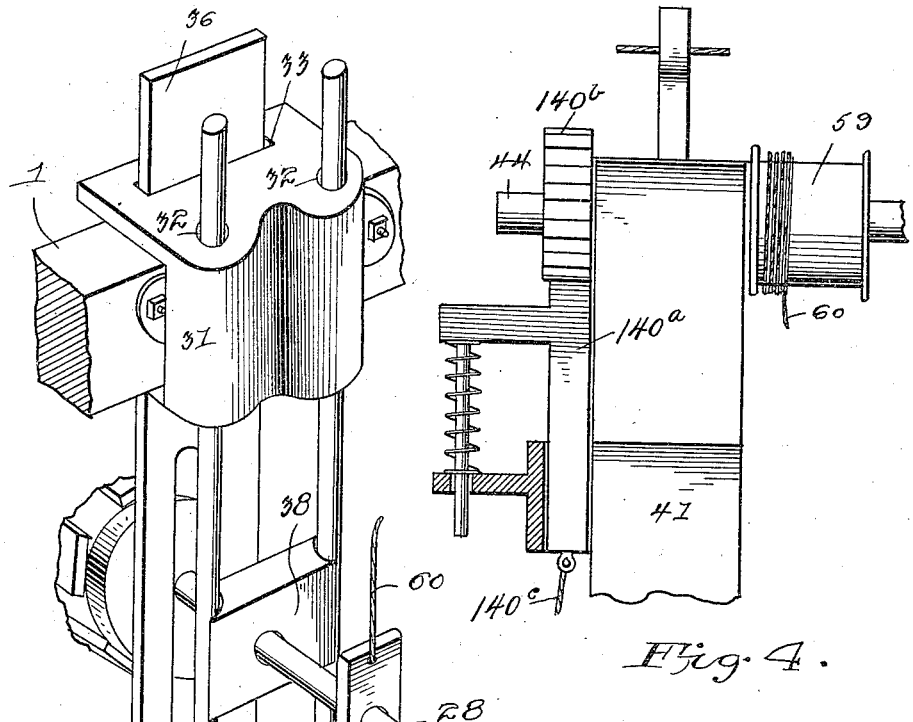
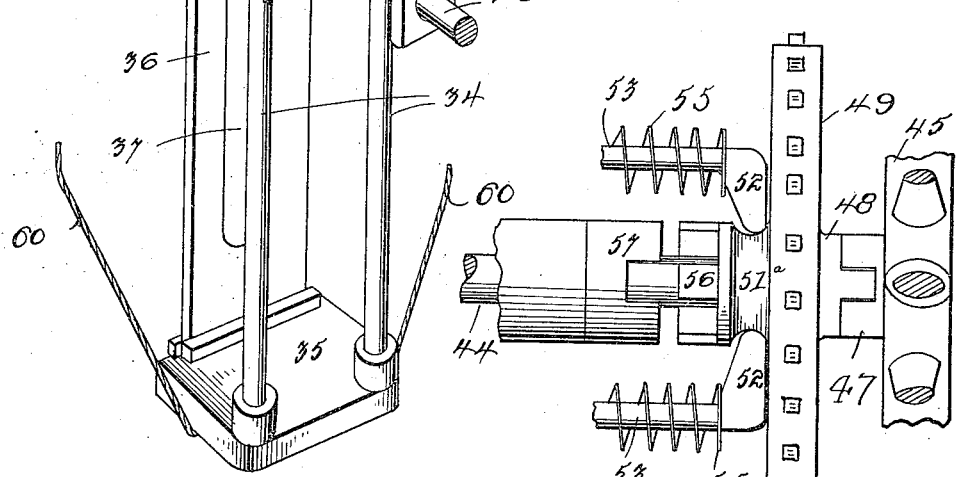

UNITED STATES PATENT OFFICE.

CARL JASS, OF HORICON, WISCONSIN.

EARTH-PULVERIZING MACHINE.

1,045,295.        Specification of Letters Patent.        Patented Nov. 26, 1912.

Application filed May 27, 1909. Serial No. 498,596.

*To all whom it may concern:*

Be it known that I, CARL JASS, a citizen of the United States, residing at Horicon, in the county of Dodge and State of Wisconsin, have invented certain new and useful Improvements in Earth-Pulverizing Machines, of which the following is a specification, reference being had therein to the accompanying drawings.

This invention relates to earth pulverizing machines and the principal object of the same is to provide a novel arrangement of means for adjusting the earth pulverizing rollers.

With the above and other objects in view, the invention contemplates the employment of a frame which carries earth-pulverizing rollers at its forward portion, the said rollers being arranged in spaced relation and having novel adjusting means, whereby they may be adjusted vertically to accommodate any inequalities upon the surface upon which they are working.

In carrying out the objects of the invention generally stated above, it will be understood that the essential features of the invention are necessarily susceptible of changes in details and structural arrangements, but one preferred and practical embodiment of the same is shown in the accompanying drawings, wherein like characters of reference indicate like parts in the several views, and Figure 1 is a side elevation of a portion of the improved pulverizing machine. Fig. 2 is a top plan view of said portion. Fig. 3 is a detail perspective view of a bearing for the pulverizing rollers. Fig. 4 is a fragmentary detail view of a pawl and ratchet device for said rollers. Fig. 5 is a similar view of a clutch device for said rollers.

In the accompanying drawings is shown a pulverizing machine consisting of a supporting frame having longitudinally-extending side members 1 and one or more transversely-arranged end-members 2, arranged to form a substantially rectangular frame. Said frame is also provided with a coupling bar 5 which is rigidly connected with the short bar 6 projecting rearwardly from the front connecting member 2. The front of the connecting member 2 has three draft rods or bars 7, 8 and 9 projecting from the forward side thereof, said bars being arranged respectively adjacent each end of said member and at its intermediate portion.

As thus far described, it will be observed that the frame of the machine is divided by means of the bars 5 and 6, such division providing space within the frame for the independent operation of a pair of pulverizing rollers 18 which are of duplicate construction. Each roller has end-disks 20 which are connected by spaced bars 22, one edge of each bar being provided with a plurality of rectangularly-spaced openings for the passage of teeth 25, the penetrating ends of which project beyond said bars. Each roller is provided with end-shafts 28 and 29, the shafts 28 of each roller being the outwardly-projecting ones and the shafts 29 being the inwardly-projecting ones. The shafts 28 are each provided with a sprocket wheel 30 by means of which said rollers are rotated, as will be explained.

Each of the members 1, 5 and 6 is equipped with a hanger bearing 31 which overlaps and is securely fastened thereon. The outer side of each bearing is provided with two vertically-arranged spaced openings 32 and on its inner side or edge with a longitudinally-arranged elongated slot 33. A pair of guide-rods 34 are slidably mounted in the openings 32 of each hanger-bearing, said rods projecting above and below said bearing and at their lower ends connected with the outer edge of a bracket 35. The inner end of each bracket connects with a vertically-arranged guide-plate 36 having a centrally-arranged slot 37 through which the respective shaft 28 or 29 of the roller projects. The guide rods 34 lie on opposite sides of each shaft and engage with the opposed grooved edges of a bearing block 38 wherein the respective shaft is journaled, which blocks and rods, together with the slotted plates 36 assure of the outer ends of the roller being confined to a vertical movement while being adjusted.

Each of the side members 1, 5, and 6 of the frame is provided with a vertically-arranged standard 41, said standards being in opposed pairs. Each pair of standards is provided with end bearings 43 for a shaft 44, the outer ends of which are provided with sprocket wheels 45, each of which has a chain connection 46 with the sprocket wheel 30 carried by the shaft 28 of the rollers 18. The sprocket wheel 45 is loosely mounted on the shaft 44 and is provided with a clutch member 47 adapted for engagement with a clutch member 48 of a similar sprocket 49, which has a chain connection 50 with a sprocket wheel 51 mounted on a driven axle 16. The other side of each sprocket wheel 49 is provided with a boss having an annular groove 51$^a$, the opposite portions of which are engaged by the angular ends 52 of a pair of arms 53 which project through bracket bearings 54 projecting from the standard 41. Said arms 53 are slidably mounted in said bearings and have a spring 55 coiled about them and interposed between their angular end and said bearing. The tension of said springs is sufficient to cause said arms to hold the sprocket wheel 49 clutched to the sprocket wheel 45. Pulleys 59 are also mounted fast on the shaft, one of said pulleys being adjacent to each of the standards 41, said pulleys having one end of the cable 60 wound thereon, the other end thereof being connected to the hanger bearings of the shafts 28 of the rollers 18.

The side member 1 is also provided with a bearing 76 for a slidable rod 77, the lower end of which carries an outwardly-projecting sub-shaft 78 upon which a sprocket wheel 79 is mounted, and which engages with the chain for rotating the respective rollers 18. The rod 77 has a spring 80 coiled about it and interposed between its end and the bearing 76. The said sprocket 79 obviously maintains tension on the chains which operate the pulverizing rollers 18.

The longitudinal member 5 of the frame adjacent to its rear end is provided with a vertical standard 130 and adjacent the upper end of this standard there is provided a guide box 135 having suitable openings for the reception of notched bars 138. The cables which control the movement of the arms 53 are led to these bars so that the movement of said arms may be controlled therefrom.

In the operation, when it is desired to lift one or the other of said rollers, it is merely necessary to relax the tension of the proper cable and allow the clutch to engage. By means of a suitable pawl and ratchet mechanism 140 the roller is kept from dropping back when the clutch is again pulled out of engagement after the roller has been sufficiently elevated, forward movement of the vehicle having actuated the lifting drum through the medium of the sprockets and chains. This pawl and ratchet mechanism includes a pawl 140$^a$ adapted to engage a ratchet 140$^b$, and to the pawl 140$^a$ is secured a cord 140$^c$ which is positioned adjacent the operator's seat so that by pulling on the cord he can release the pawl from the ratchet. It will be obvious that by releasing the pawl and ratchet the respective member may be allowed to return to its lowermost position.

Having thus described the invention, what is claimed as new is:

1. In an earth pulverizing machine of the character described, a frame, hanger bearings carried thereby and provided with guide-ways projecting from one side, rods slidable in said guide-ways, a slide-plate carried by the other side of said bearings and provided with a longitudinal slot, a bracket connection between the lower ends of said rods and the lower end of said plate, a pulverizing roller supported on said bracket, means for vertically adjusting said bracket, and means for vertically adjusting the rollers independent of said bracket.

2. In an earth pulverizing machine of the character described, a frame composed of side members and a central division member, bearings carried by said members, said bearings being arranged in pairs with the members of each pair oppositely disposed, slidable rods projecting through one side of each bearing, a slidable plate projecting through the opposite side of each bearing and provided with a longitudinally-extending vertically-arranged slot, a bracket connecting the lower portions of the rod and plate, a pulverizing roller supported on each pair of brackets, means for vertically adjusting said brackets, and independent means for vertically adjusting the rollers.

3. In an earth pulverizing machine of the character described, a frame, hanger bearings carried thereby and provided with guide-ways projecting from one side, rods slidable in said guide-ways, a slide plate carried by the other side of said bearings and provided with a longitudinal slot, a bracket connection between the lower ends of said rods and the lower end of said plate, a journal bearing slidable on said rods, a pulverizing roller having a journal carried in the last-mentioned bearing, means for vertically adjusting the bracket, and means for vertically adjusting the journal bearing on the rods.

4. In an earth pulverizing machine of the character described, a frame, hanger bearings carried thereby and provided with guide-ways projecting from one side, rods slidable in said guide-ways, a slide plate carried by the other side of said bearings and provided with a longitudinal slot, a bracket connection between the lower ends of said rods and the lower end of said plate, a journal bearing slidable on said rods, a pulverizing roller having a journal carried in the last-mentioned bearing, means for vertically adjusting the bracket, means for vertically adjusting the journal bearing on the rods, said means comprising a driven axle, driven shafts, winding drums on said shafts and provided with clutch means for engaging said drums, and the driving means, and cable connections between said winding drums, bracket and pulverizing rollers.

In testimony whereof I hereunto affix my signature in presence of two witnesses.

CARL JASS.

Witnesses:
W. S. CUMMINGS,
E. T. FREEMAN.